United States Patent

Song

Patent Number: 5,678,859
Date of Patent: Oct. 21, 1997

[54] SEAT BELT

[76] Inventor: Gi Suk Song, 263-2, Angung-ri, Seonghwan-eup, Cheonahn-kun, Chungcheongnam-do, Rep. of Korea

[21] Appl. No.: 613,948

[22] Filed: Mar. 11, 1996

[51] Int. Cl.[6] .................................................. B60R 22/06
[52] U.S. Cl. ................................................... 280/804
[58] Field of Search .................................. 280/802, 803, 280/804

[56] References Cited

U.S. PATENT DOCUMENTS

| 4,335,902 | 6/1982 | Motonami et al. | 280/804 |
| 4,353,579 | 10/1982 | Takada | 280/804 |
| 4,392,673 | 7/1983 | Suzuki et al. | 280/804 |
| 4,441,737 | 4/1984 | Wimmer et al. | 280/804 |
| 4,655,476 | 4/1987 | Paludetto | 280/804 |

Primary Examiner—Kenneth R. Rice
Attorney, Agent, or Firm—Keck, Mahin & Cate

[57] ABSTRACT

A seat belt is disclosed including a first belt having ends each fixed to a different position of a door, the first belt having a stop between the ends; a second belt returnably wound; a retractor fixed to the inner surface of a seat; and coupling means for connecting an intermediate portion of the first belt to the second belt, wherein, when the door is opened, a motor allows a wire to pull the top of the first belt to a hinge of the door so that the second belt wound into the retractor with the stop interrupted by the coupling means becomes loose, and when the door is closed, the belt is wound into the retractor with the stop interrupted by the coupling means, thereby winding a passenger's body and belly at the same time.

8 Claims, 6 Drawing Sheets

SEAT BELT

BACKGROUND OF THE INVENTION

The present invention relates to a seat belt automatically put on when a passenger gets on a vehicle and then closes its door. More particularly, this invention relates to a seat belt for protecting both the passenger's body and waist with a single retractor.

Generally, there are mounted seat belts for protecting a driver and passengers in the passenger seat and bench seats. On driveways and highways, it is legislated for every passenger to put on a seat belt. However, in order to put on a general seat belt, a belt must be drawn out from a retractor while a passenger holds an insertion piece, and then the insertion piece must be fit into the buckle. Therefore, such a seat belt is very inconvenient in its usage. In addition, when the passenger puts it on, the belt is always pulled and presses his or her belly by the resilient force of a built-in spring of the retractor. For this reason, some people avoid putting on the seat belt.

There has been suggested a seat belt automatically put on when the driver or passenger is seated in his or her seat. Such a seat belt is being increasingly in practical use, and divided into two-point and three-point types.

With a two-point seat belt, only a passenger's body is wound using a single retractor. In case of an overturn accident not an overall crash, this type of seat belt cannot protect the passenger. In addition, with this type belt, an additional rail must be formed on the frame of window, complicating its installation structure. A three-point seat belt is made to protect a passenger's body and waist by installing two retractors respectively having a belt winding body and a belt winding waist. This type seat belt is advantageous in safely protecting the passenger but disadvantageous in increasing its production cost with two retractors.

SUMMARY OF THE INVENTION

Therefore, it is an object of the present invention to provide a three-point seat belt using a single retractor.

To accomplish the object of the present invention, there is provided a seat belt comprising: a first belt having ends each fixed to a different position of a door, the first belt having a stop between the ends; a second belt returnably wound; a retractor fixed to the inner surface of a seat; and coupling means for connecting an intermediate portion of the first belt to the second belt, wherein, when the door is opened, a motor allows a wire to pull the top of the first belt to a hinge of the door so that the second belt wound into the retractor with the stop interrupted by the coupling means becomes loose, and when the door is closed, the belt is wound into the retractor with the stop interrupted by the coupling means, thereby winding a passenger's body and belly at the same time.

BRIEF DESCRIPTION OF THE ATTACHED DRAWINGS

DETAILED DESCRIPTION OF PREFERRED EMBODIMENTS

Hereinafter, preferred embodiments of the present invention will be described with reference to the attached drawings.

Figure 1:
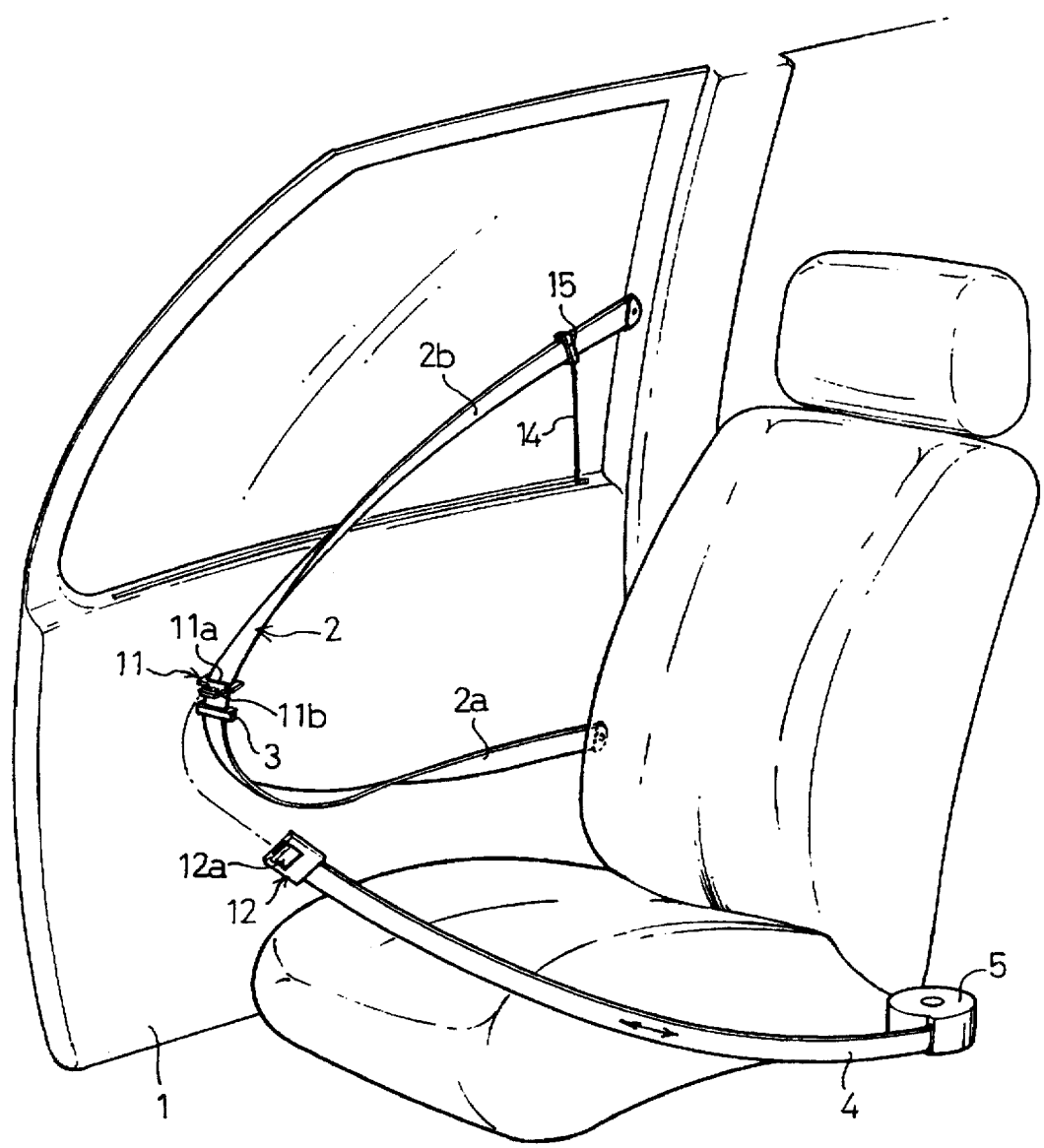
FIG. 1 is an exploded perspective view of a seat belt of the present invention.
Figure 2:
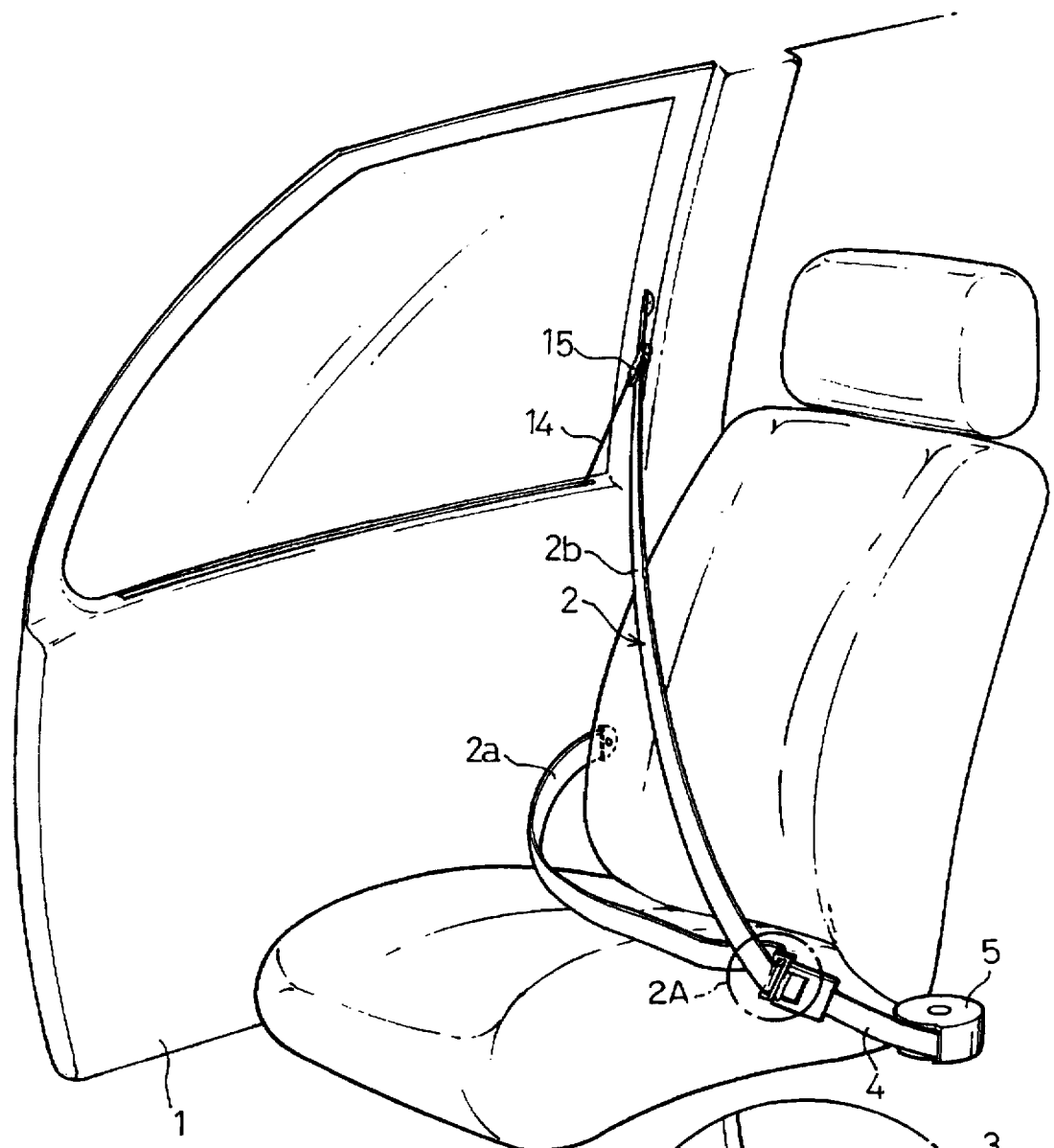
FIG. 2 is an assembly perspective view of the seat belt of FIG. 1.
Figure 2A:
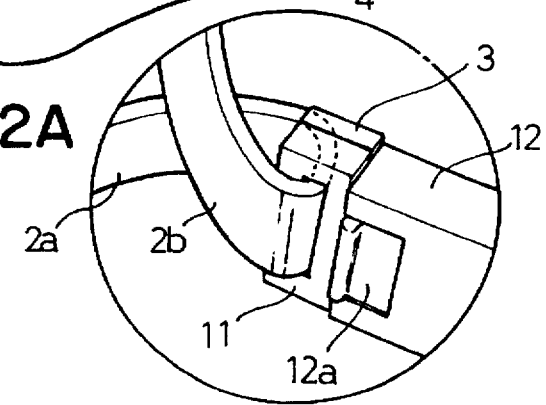
Figure 3:
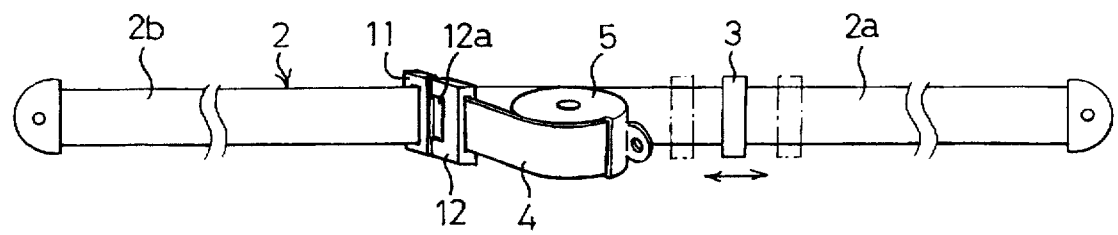
FIG. 3 is a front view of the seat belt in which the first belt is unfolded.

Referring to FIGS. 1, 2 and 3, the present invention is constructed in such a manner that a stop 3 is given between both ends of a first belt 2 respectively fixed to a different position of a door 1. On the left of a seat, a retractor 5 is fixed with a second belt 4 returnably wound. In the first embodiment of the present invention, stop 3 is fixed on the intermediate portion of first belt 2. In another embodiment shown in FIG. 4, the stop may be replaced with a mobile one-touch clip 6. The fixed stop 3 may be formed in such a manner that a bolt and nut are fastened on first belt 2 in order to act as the stop. In another case, waist belt 2a forming the first belt 2 is made to be thicker than shoulder belt 2b so that their difference of thickness forms the stop.

Figure 4A:
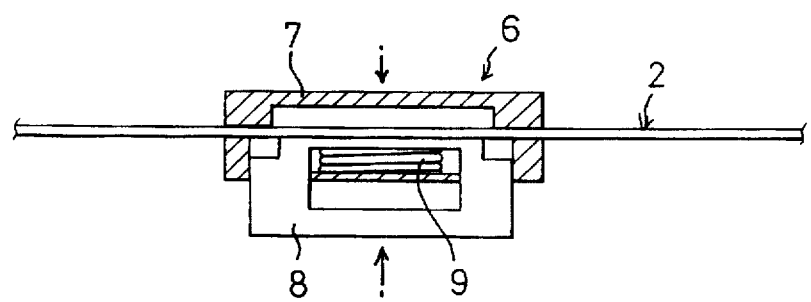
FIG. 4 is a vertical sectional view of another embodiment of the stop installed on the first belt.
Figure 4B:
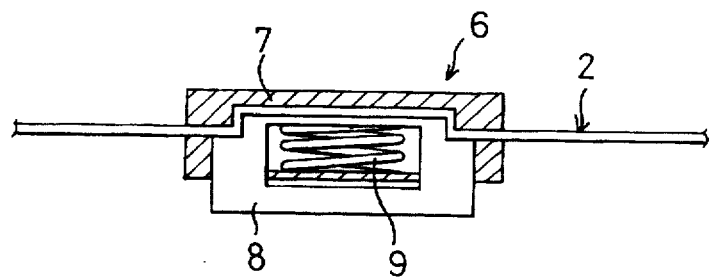

As shown in FIG. 4, the mobile stop is made so that a moving piece 7 is coupled onto first belt 2 to be movable left and right, and that a support piece 8 is elastically installed with a spring 9 inside the moving piece. Support piece 8 is positioned on first belt 2 by the resilient force of the spring.

Figure 5:
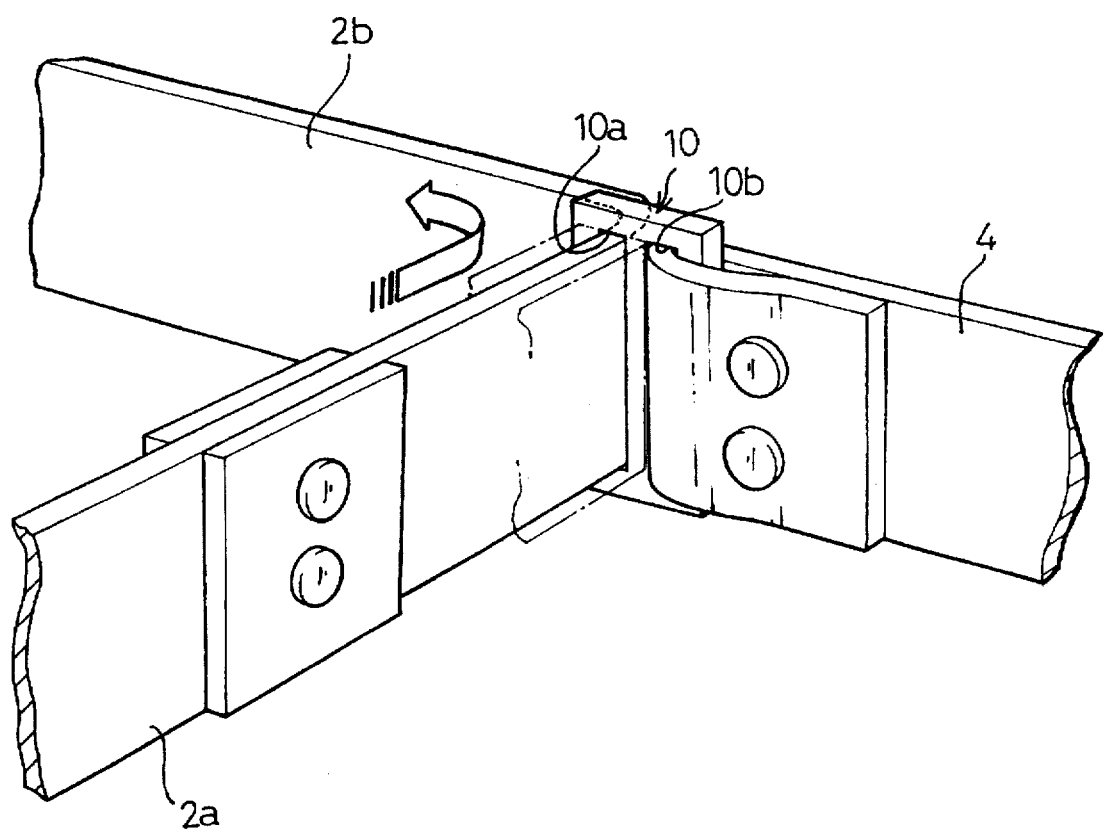
FIG. 5 is a perspective view of important components of the present invention in which another embodiment of the connection means is shown.

The intermediate portion of first belt 2 whose ends are fixed to door 1 is coupled to second belt 4 by a connection device so that they engage with each other. The connection device is embodied so that, as shown in FIG. 5, a first loop 10a into which first belt 2 is movably fitted is given at one end and a second loop 10b to which one end of second belt 4 is fixed is provided at the other end. In another embodiment, the connection device is made to have, as shown in FIGS. 1, 2 and 3, a first connection member having a loop into which the first belt is movably fitted on one side and having a hook on the other end, and a second connection member whose end is fixed to the second belt and having a stop piece for locking and releasing the hook.

In the former case, first belt 2 cannot be separated from second belt 4. In the latter case, hook 11b formed on first connection member 11 is separable from stop 12a. In other words, a passenger can separate the seat belt even when the door is not opened because it is damaged.

Figure 6:
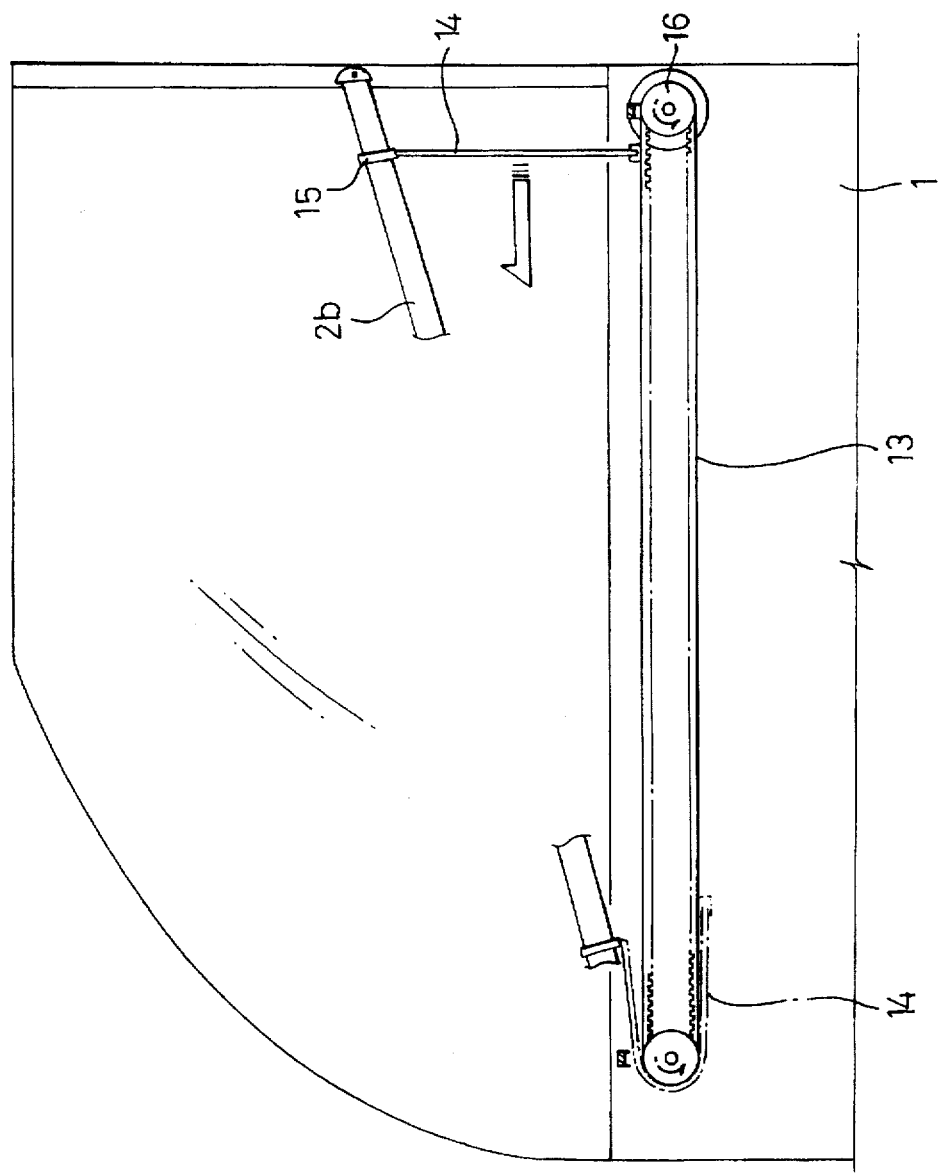
FIG. 6 shows a state in which the first belt and wire are connected.
Figure 7A:
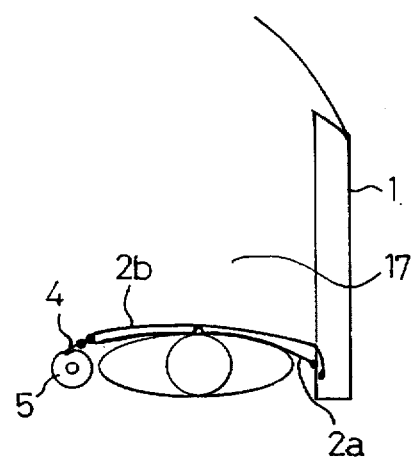
FIG. 7A shows a state in which the seat belt of the present invention is worn by a passenger in his or her seat.

From now on, the operation and effect of the present invention will be explained below. Referring to FIG. 7A, when the passenger is seated, the seat belt is put on automatically. Specifically, when door 1 is closed, second belt 4 is wound into retractor 5 with first loop 10a blocked by stop 3, and as shown in FIG. 6, loop 15 fixed to wire 14 secured on timing belt 13 and coupled to shoulder belt 2b of first belt 2 is positioned on the fixed portion of the first belt. In this case, shoulder belt 2b and waist belt 2a of first belt wind the passenger's body and waist at the same time. This case is that a three-point seat belt is put on.

When the passenger puts on the seat belt and then pulls the door's locking lever (not shown) in order to get off the car, power is automatically applied to a motor for operating a driving pulley 16 wound with timing belt 13 so that the position of timing belt 13 varies and therefore wire 14 whose end is fixed to timing belt 13 moves toward door 1's hinge. This is enabled by providing a contact of the motor in the locking lever, which is the same as prior art in its structure and omitted in its drawing and description.

Figure 7B:
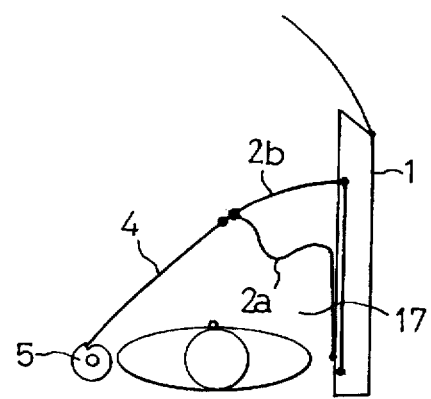
FIGS. 7B and 7C show states in which the second belt becomes loose as the wire is taken up.
Figure 7C:
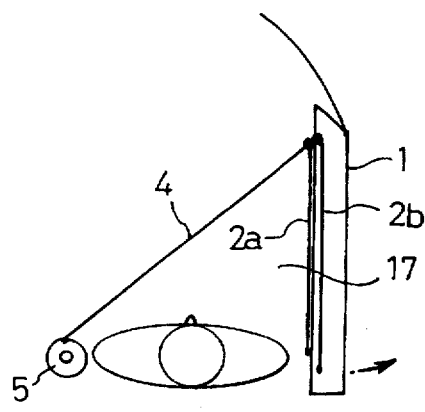
Figure 7D:
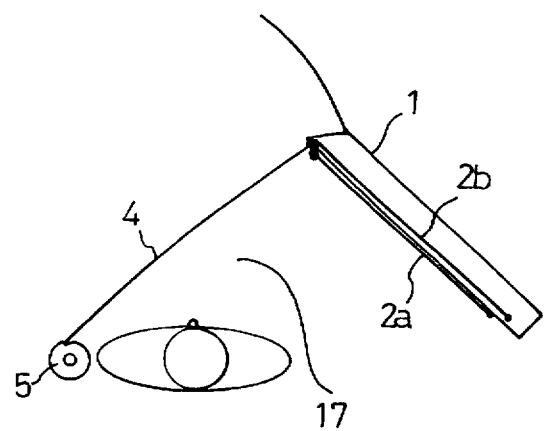
FIG. 7D shows a state in which the door is opened.

When the position of wire 14 varies, loop 15 fixed to one end of the wire and fit into shoulder belt 2b moves and pulls shoulder belt 2b toward the door's hinge as shown in FIGS. 7B and 7C, so that second belt 4 is drawn out from retractor 5. Accordingly, a space 17 is formed in front of the passenger as in FIG. 7C so that he or she safely opens door 1 and gets off as shown in FIG. 7D.

Meanwhile, when the passenger holds and pulls the door's grip in order to get on the car while door 1 is closed, to the contrary, shoulder belt 2b moves toward door 1's hinge with the motor driven so that second belt 4 placed inside retractor operates in the sequence of FIGS. 7A, 7B and 7C. In this situation, the passenger is able to open door 1 and take a seat, as shown in FIG. 7D.

Thereafter, when the passenger closes door 1, driving pulley 16, which were rotated counterclockwise, now rotates clockwise to release the pulling force of shoulder belt 2b so that second belt 4 is rewound into retractor 5. Then, shoulder belt 2b of first belt 2 winds the passenger's body, and waist belt 2a winds the waist.

In case stop 3 is made with one-touch clip 6 as shown in FIG. 4, the seat belt of the present invention can appropriately vary the position of the stop, eliminating inconvenience with abnormal physical shape. If someone has a relatively fat belly or gets on the car right after meal, the position of one-touch clip 6 varies to elongate waist belt 2a.

In case the coupling means for connecting first and second belts 2 and 4 is made with first coupling member 11 having hook 11b and second coupling member 12 having stop piece 12a, as shown in FIGS. 1, 2 and 3, for overturn accident in which passengers must escape from the car rapidly, the seat belt can be quickly released without door 1 opened.

As described above, the present invention is advantageous in that first, a three-point seat belt is implemented with a single retractor, reducing its production cost, secondly, the length of the shoulder belt and waist belt can be varied appropriately, enhancing feeling when the belt is put on, thirdly, the retractor is installed on the seat's left and the motor, driving source of wire, is installed inside the door, simplifying its structure, and finally, for a vehicle accident, the seat belt can be separated without the door opened, enabling quick evasion.

What is claimed:

1. A seat belt comprising:
    a first belt having ends each fixed to a different position of a door, said first belt having a stop between said ends;
    a second belt returnably wound;
    a retractor fixed to the inner surface of a seat; and
    coupling means for connecting an intermediate portion of said first belt to said second belt,
    wherein, when the door is opened, a motor allows a wire to pull the top of said first belt to a hinge of the door so that said second belt wound into said retractor with the stop interrupted by the coupling means becomes loose, and when the door is closed, said belt is wound into said retractor with the stop interrupted by said coupling means, thereby winding a passenger's body and belly at the same time.

2. A seat belt as claimed in claim 1, wherein said stop is movably installed on said first belt.

3. A seat belt as claimed in claim 1, wherein said stop is a one-touch clip.

4. A seat belt as claimed in claim 2, wherein said stop is a one-touch clip.

5. A seat belt as claimed in claim 1, wherein a waist belt of said first belt is thicker than a shoulder belt thereof so that their difference forms said stop.

6. A seat belt as claimed in claim 1, wherein said stop is made with a bolt and nut.

7. A seat belt as claimed in claim 1, wherein said coupling means is a connection member in which a first loop into which said first belt is movably fitted is given at one end and a second loop to which one end of said second belt is fixed is provided at the other end.

8. A seat belt as claimed in claim 7, wherein said coupling means is made with a first connection member having a loop into which said first belt is movably fitted on one side and having a hook on the other end, said coupling means further having a second connection member whose end is fixed to said second belt and having a stop piece for locking and releasing said hook.

* * * * *